(12) United States Patent
Coleman et al.

(10) Patent No.: US 11,037,218 B1
(45) Date of Patent: Jun. 15, 2021

(54) PRIORITIZED ORDERING SYSTEM AND METHOD

(71) Applicant: T-MOBILE INNOVATIONS LLC, Overland Park, KS (US)

(72) Inventors: Lisa Coleman, Kansas City, MO (US); Blythe P. Cook, Arlington, VA (US); Mohanakrishnan V. Giridharan, Overland Park, KS (US); Jeffrey S. Henshaw, Ashburn, VA (US); Aleksander Koromyslov, Olathe, KS (US); Deepthi Kota, Overland Park, KS (US); Neilesh Nath, Ashburn, VA (US); Nagaraj Palaniswamy, Overland Park, KS (US); Robert R. Roy, Ashburn, VA (US); Kathy Ternes, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/431,550

(22) Filed: Jun. 4, 2019

(51) Int. Cl.
  *G06Q 30/00* (2012.01)
  *G06Q 30/06* (2012.01)
  *G06Q 10/08* (2012.01)

(52) U.S. Cl.
  CPC ....... *G06Q 30/0623* (2013.01); *G06Q 10/083* (2013.01); *G06Q 30/0621* (2013.01); *G06Q 30/0633* (2013.01); *G06Q 30/0641* (2013.01)

(58) Field of Classification Search
  CPC ........... G06Q 30/0623; G06Q 30/0621; G06Q 30/0633; G06Q 30/0641; G06Q 10/083
  See application file for complete search history.

(56) References Cited

U.S. PATENT DOCUMENTS

| 7,986,935 | B1* | 7/2011 | D'Souza | G06Q 30/04 455/406 |
| 8,204,794 | B1* | 6/2012 | Peng | G06Q 30/06 705/26.1 |
| 2007/0198631 | A1* | 8/2007 | Uhlmann | G06Q 10/06 709/203 |
| 2013/0246212 | A1* | 9/2013 | Sullivan | G06Q 30/0611 705/26.4 |
| 2014/0024348 | A1* | 1/2014 | Hurst | H04W 8/24 455/414.1 |

(Continued)

OTHER PUBLICATIONS

Third-party retailers and carriers offering iPhone X pre-orders tonight. (Oct. 27, 2017). ICT Monitor Worldwide Retrieved from https://dialog.proquest.com/professional/docview/1956164134?accountid=131444.*

(Continued)

*Primary Examiner* — Resha Desai

(57) ABSTRACT

A system for ordering a new electronic device is provided with an application programming interface to receive notification of the availability of a new electronic device and to send a selection of a feature for that new electronic device. A database can be coupled to a server to store the selected feature and to store a priority status value assigned to the new electronic device when feature selections are made. The priority status value allows prioritized ordering of a new electronic device. Preferably, one or more new electronic devices are ordered within a pre-determined period after a pre-order opening date, all of which is performed on the application programming interface of an electronic device.

15 Claims, 10 Drawing Sheets

(56) References Cited

U.S. PATENT DOCUMENTS

| 2015/0025919 A1* | 1/2015 | West | G06Q 10/02 |
| | | | 705/5 |
| 2015/0235270 A1* | 8/2015 | Partida | H04W 8/18 |
| | | | 705/14.64 |

OTHER PUBLICATIONS

Katzer, Robin D., et al., "Database Architecture for Reducing the Burden on an On-Disk Database," filed Apr. 6, 2020, U.S. Appl. No. 16/841,388.

Marquardt, Ronald R., et al., "Multi-tier Identities in an RFID Chip," filed Dec. 8, 2020, U.S. Appl. No. 71/115,596.

\* cited by examiner

PRIORITIZED ORDERING SYSTEM AND METHOD

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Companies that provide cellular and/or internet services are often referred to as network service providers. Network service providers can provide their customers with appropriate access to a network across either a wired or wireless communication channel. For example, a wireless communications network may require a mobile electronic device with both cellular and internet connectivity. The network service provider can operate both the cellular and internet connectivity to allow a user (the network service provider customer or subscriber) to remotely access their account and perform certain on-line transactions, etc.

In addition to providing wired or wireless network connectivity, network service providers can also provide hardware and/or software to effectuate that connectivity. In many instances, the hardware and software is available only from a third party. However, as a service to its customer, the network service provider may inform its customers when the hardware or software is available from the third party seller or manufacturer. For example, as a benefit offered by the network service provider, a customer of that provider may be periodically notified when upgrades are available to the customer's existing electronic device when an announcement is made from a manufacturer. The upgrade can be a hardware or software component, a version of hardware or software, or an entirely different hardware or software item. Henceforth, whether a component or an entirely different hardware and/or software component, the upgrade (whether a component or entirely different and possibly newer item) is referred to as a new electronic device.

Certain new electronic devices, whether hardware, software, component, or the entire item, are in extremely high demand. For example, Apple Inc. offers high demand electronic devices, such as mobile phones, tablets, laptop computers and desktop computers. As the new electronic devices are announced by Apple, customers often wait in line at stores to receive their new electronic device. The wait time can be unduly long and burdensome. As a service to its customers, certain network service providers, such as Sprint Communications Company, can offer notification to its customers of an upcoming new electronic device and the dates in which those devices are available from, for example, Apple, Samsung, or other manufacturers.

SUMMARY

In an embodiment, a system for ordering a new electronic device is disclosed. The system comprises an electronic device configured with an application programming interface to receive notification of the availability of the new electronic device, and to send a selection of a feature for the new electronic device if a user of the electronic device is eligible for an upgrade to the new electronic device. The system further comprises a server communicatively coupled to the electronic device. A system still further comprises a database coupled to the server and configured to store the selected feature for the new electronic device sent to the server from the electronic device, and to store a priority status value corresponding to a relative place in line at which a pre-order for the new electronic device is taken relative to other pre-orders for the new electronic device.

In another embodiment, a non-transitory computer readable database memory medium is disclosed. The database medium comprises a pre-order opening date data. The database medium further comprises a feature selection data for a new electronic device. The database medium still further comprises a priority status value data indicating a relative place in line at which a pre-order for the new electronic device is taken relative to other pre-orders for other new electronic devices. The database medium yet further comprises an order fulfillment command data for processing, based on the priority status value data, the feature selection data for the new electronic device within a pre-determined period after the pre-order opening date data is processed.

In yet another embodiment, a method for order a new electronic device is disclosed. The method comprises receiving a notification of an upgrade to a new electronic device. The method further comprises selecting a feature for the new electronic device, and storing the feature for the new electronic device along with a pre-order opening date. The method yet further comprises assigning a priority status value to the stored feature corresponding to the new electronic device, and ordering the new electronic device within a pre-determined period after the pre-order opening date.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
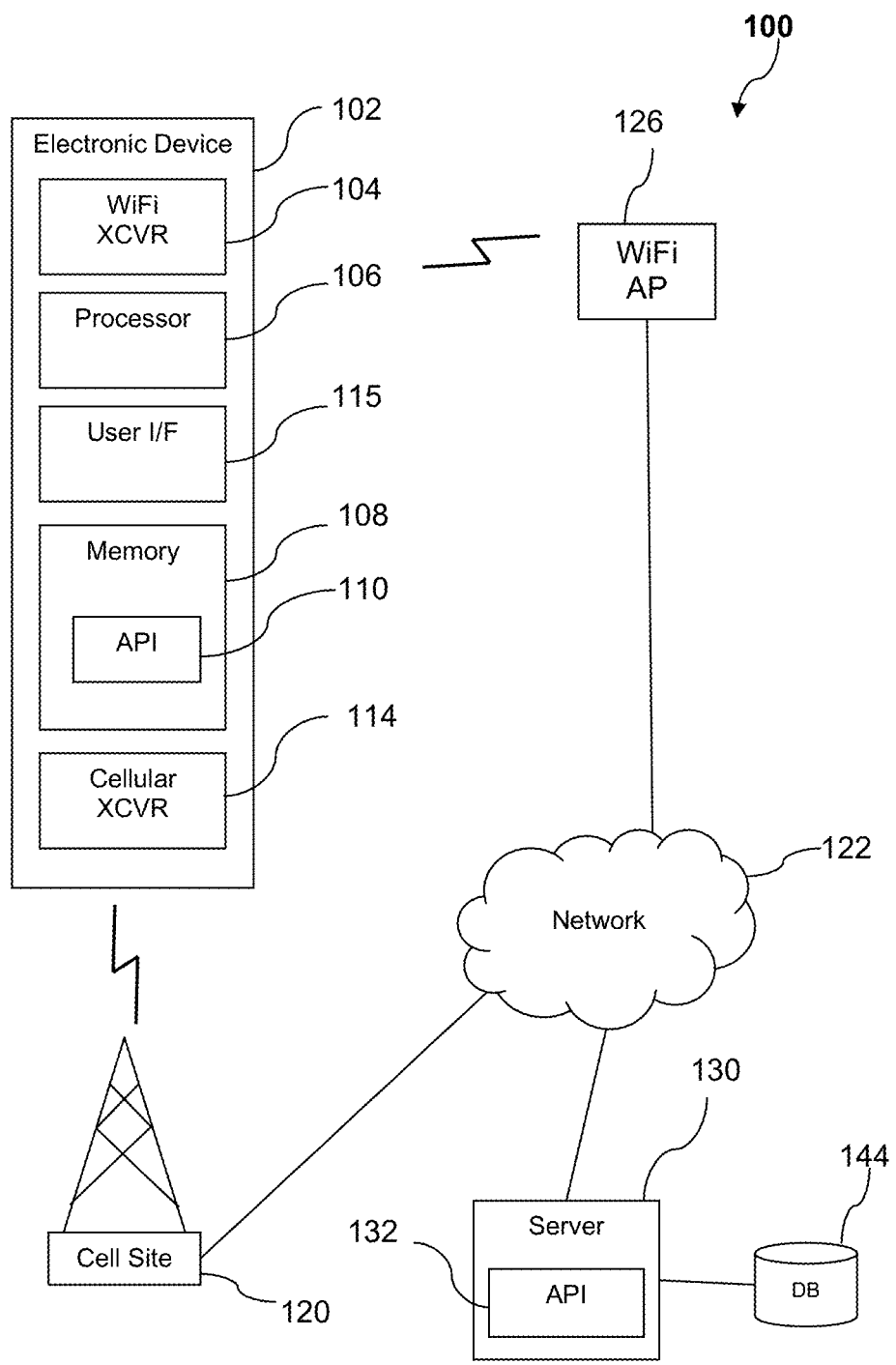
FIG. 1 is a block diagram of an electronic communication system according to an embodiment of the disclosure.

It should be understood that although illustrative implementations of one or more embodiments are described below, the disclosed system and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The network service provider can provide an application programming interface, or API, downloaded upon its customers' electronic device from which announcements of the new electronic devices can be sent to the customer. Unfortunately, however, after receiving the notification, the customer typically then must go to the network service providers' store, or to the manufacturer, and get in line to order the new electronic device. In some instances, customers wait in line overnight to place their orders, and even when the order is placed, the customer must still wait possibly weeks, if not months, before he or she can then pick up their new electronic device, or that new electronic device is shipped to the customer. It would be advantageous to minimize the burdensome wait time by providing a network service provider customer with a prioritized ordering system and method.

Therefore, in addition to providing customers with access to a network, network service providers should also provide easier access to upgrades or new hardware and software components or items, hereinafter new electronic devices, which operate on such networks. Network service providers often offer customers a network access plan, both cellular and internet access. Such providers often include with that plan, either a lease or purchase option for the new electronic devices if and when a customer is eligible for those devices and when the devices are available from either the network service provider or a third party manufacturer.

In some instances, network access and multiple electronic devices are tied to a single plan, such as a family plan, where multiple family members each have network access, a mobile phone number, subscriber identification, and/or a corresponding electronic device. When new electronic devices become available and one or more family members are eligible for that upgrade, unfortunately one or more family members must go to the provider or to the manufacturer storefront or online, physically or virtually stand in line, place an order for the new electronic device and again wait until that order is fulfilled and the new electronic device is available for pickup or shipment. This process becomes far too burdensome when upgrades become available, each time an upgrade is available, when the subscribers are eligible for the upgrades, and if there are multiple subscribers on a single family plan spread across each family member.

In order to overcome many of the above burdens, network service providers recognize that each subscriber, whether on a family plan or on an individual plan, have an electronic device in order to access the network. Knowing that each subscriber has an electronic device, and the ease by which an API can be downloaded as a user interface application onto that subscriber's electronic device, an easier and less burdensome ordering process can be deployed from that application rather than each subscriber having to wait in line to place an order.

For example, instead of waiting in line to place an order, a subscriber can download an application available from the network service provider. The application can be launched from the subscriber's electronic device, and includes a user interface in which a user or subscriber can then set up a computerized queuing or reservation system and method in which a priority status value can be assigned. For example, the priority status can be established when the user's electronic device receives notification via the downloaded application or through an email or SMS text message of the availability of a new electronic device. That notification can be sent from the provider, and specifically from the network service provider server. Once the subscriber receives the notification, at some point thereafter, the subscriber interacts with the user interface of the application to make a selection of a desired feature for the new electronic device. That feature can be, for example, color, memory size, screen size, processor speed, payment plan, protection plan, etc. for the new electronic device that the customer wishes to order. However, instead of standing in line to place an order, the customer makes the selection of the desired new electronic device upon that customer's existing electronic device and a database coupled to for example, a web server that is communicatively linked to the electronic device. The database can store a correspondence or an association between each subscriber to that subscriber's desired new electronic device selection and a priority status value assigned to that desired new electronic device.

The priority status value is preferably a numerical value corresponding to a relative place in line. The relative place in line is a value stored as a sequence of bits, rather than a physical location of that customer relative to other customers in line outside, for example, a storefront. The relative place in line symbolizes where that subscriber's priority status for his or her new electronic device is relative to other subscriber's new electronic devices during a pre-order. The relative place in line symbolizes where that network service provider's customer or subscriber is in line when pre-orders open.

When the subscriber gets in line and is assigned a priority status value, achieved within the purview of the user interface on the subscriber's electronic device, the application will then send a confirmation to the subscriber that his or her priority status has been saved and notification will be sent when pre-orders open. Further notification may be sent that the subscriber will be given an opportunity within a limited time frame to place an order according to that subscriber's priority status once pre-orders open. The subscriber may also be given an opportunity to change his or her selection after the priority status is assigned and, in so doing, those changed selections will nonetheless not affect the previously assigned priority status value for that changed-selection new electronic device. Thus, the subscriber remains in the same position in line even after the feature selections are changed all the way up to and including the pre-order date. Moreover, a single subscriber can queue multiple subscribers on, for example, a family plan with corresponding priority status values for each member of the family having a corresponding desired new electronic device. Multiple priority status values can therefore be assigned from a single channel or line from a single electronic device of, for example, a family member having primary authority or administrative privileges over the other family members or subscribers.

The notification to obtain priority status can be sent either through a short message service (SMS) or text message, or the notification can be sent via an e-mail or through an automated calling system. Once the subscriber completes his or her selection of features for the new electronic device, notification through text, e-mail, or any other mechanism on the electronic device user interface will be sent when the pre-orders open and that the orders must be submitted within a pre-determined time after the time when the pre-order opens. The various notifications can be sent to each electronic device within, for example, the family plan, and for each electronic device in which upgrades are available and features are selected for the corresponding new electronic device.

Once a priority status value is assigned to each of the to-be ordered new electronic devices, the electronic device can thereafter receive a pre-order notification, either through text, e-mail, automated calling, or possibly through a notification presented on the user interface of the electronic device sent from the network provider downloaded application. When the pre-order notification is sent, then the subscriber and each subscriber corresponding to the previously assigned priority status for the corresponding to-be ordered electronic device, must then preferably place the order for the corresponding new electronic device within a pre-determined time. The subscriber can change his or her selections in the interim, and one subscriber can change selections for each new electronic device that has received a priority status value on, for example, a family plan.

After the selections are possibly changed for each subscriber, mobile phone number, etc. managed from a single line or channel, and provided those selections are changed within the order time-out period, a confirmation will be sent to one or more of the electronic devices that have made the corresponding changes. That confirmation order can also be sent to an order fulfillment server, where the orders are taken, fulfilled, and a shipment notification is sent to the subscriber as to when he or she can anticipate receiving the ordered new electronic device or devices. Notification can also be sent for pickup at a designated location, such as the network service provider nearby storefront.

By establishing a priority status for pre-orders, setting a pre-order date, and fulfilling the pre-orders with an order during a set timeframe, a network service provider customer can avoid standing in line yet he or she will receive confirmation of a virtual relative place in line that is maintained when pre-orders are opened and orders are taken or fulfilled. A prioritized ordering system and method can therefore be more efficiently taken all from the convenience of the user's existing electronic device and through application software and user interface loaded onto that electronic device.

Specific details of the information technology (IT) that may implement the prioritized ordering system are provided herein below, but some comments on this IT infrastructure are made here. It will be appreciated that the prioritized ordering system is an IT system: an application or applications executed by processors in a computer system. A modern wireless communication service provider may have tens of millions of subscribers and sell tens of millions of wireless communication devices annually. Keeping track of what subscribers are eligible for a device upgrade may entail accessing a plurality of different data stores and analyzing the retrieved data. It will be appreciated that the prioritized ordering system applications will be configured to run efficiently and to avoid interference with other applications of the wireless communication service provider that may be accessing the same data stores on an on-going asynchronous basis. Said in other words, the prioritized ordering system applications will be configured to avoid impeding handling of user communication traffic (e.g., bearer traffic). At the same time, when an iconic launch of a new electronic device is announced, users may become very excited about getting into position to obtain the new device—effectively competing with other users for a limited availability of the new device on the first day or first few days. To avoid user frustration and avoid the risk of alienating subscribers, the prioritized ordering system must be responsive, timely, and reliable. Data may be examined from disparate sources including when the subscriber obtained their most recent device, whether the account is in good standing, and who is the subscriber with administrative authority on a multi-line account. The application may determine which of a plurality of communication channels—SMS text messages, email, IP notification, or other—each subscriber prefers. The application may balance sending out of notifications in each of the different communication channels so as to avoid burdening any one of the different channels in such a way as to impede the ordinary communication throughput on those channels.

Turning now to FIG. 1, a communications system 100 is illustrated for performing prioritized ordering. In an embodiment, system 100 comprises an electronic device 102. Electronic device 102 comprises an optional WiFi radio transceiver 104, a processor 106, a memory 108, a cellular radio transceiver 114, and possibly a subscriber identity module or SIM. Memory 108 comprises a non-transitory memory portion that stores a client application, or API 110. API 110, being a set of subroutine definitions, communication protocols and tools for building software and accessing the operating system, operates as a software application exercisable, in part, through a user interface 115. Electronic device 102 can be a mobile device, such as a smartphone or tablet, or personal digital assistant (PDA). Electronic device 102 can also be a wearable computer, a headset computer, a laptop computer, a notebook, or a desktop computer.

System 100 further comprises a cell site 120 and a network 122. The cell site 120 is configured to establish a wireless communication link with the cellular radio transceiver 114 of, for example, a mobile version of electronic device 102. Mobile communication can occur through a long term evolution (LTE), a code division multiple access (CDMA), a global system for mobile applications (GSM), or a worldwide interoperability for microwave access (WiMAX) wireless communication protocol. Network 122 may be one or more private networks, one or more public networks, or a combination thereof. Cell site 120 can provide communication connectivity of the electronic device 102 to the network 122. In an embodiment, system 100 further comprises a WiFi access point 126 that is configured to establish a wireless communication link with the WiFi radio transceiver 104 of an electronic device 102 as a mobile or wireless electronic device.

It is understood that electronic device 102 need not be a wireless or mobile electronic device, and communication can occur through a wired modem, gateway, router or bridge, rather than through a WiFi access point 126. Wired communication through, for example, coaxial cable, Ethernet, etc., or any other form of connectivity is therefore included in this embodiment. System 100 further comprises a server 130 that executes a server application 132. Server 130, along with the databases 144, is communicatively coupled to network 122. System 100 may comprise any number of electronic devices, any number of cell sites 120, any number of WiFi access points 126, any number of servers 130 (and corresponding databases 144) and any number of wired communication ports in addition to the mobile communication ports, cell sites, or access points.

Figure 2:
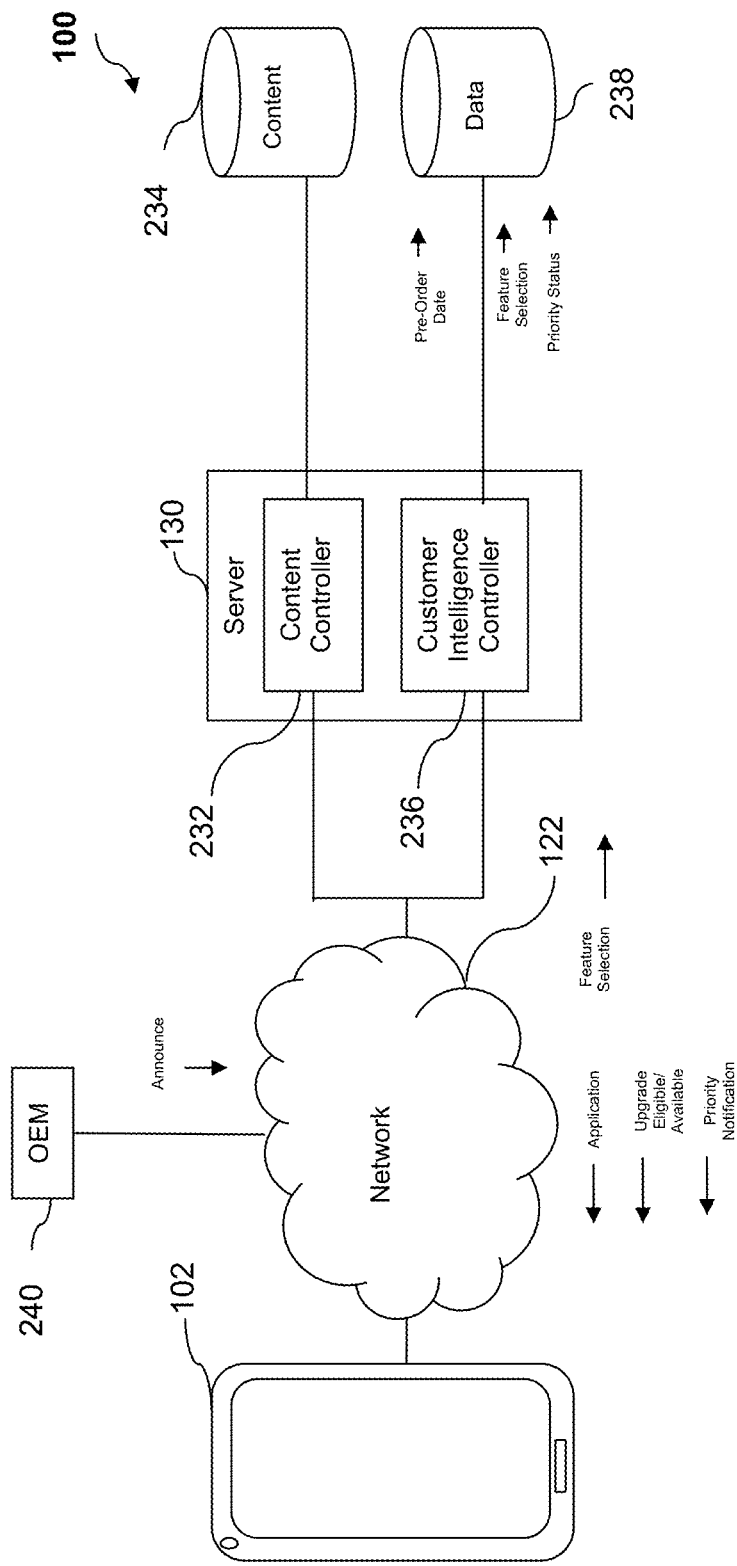
FIG. 2 is a block diagram of the electronic communication system configured as an ordering system to assign a priority status value according to an embodiment of the disclosure.

Turning now to FIG. 2, communication system 100 is illustrated according to one example in which electronic device 102 is communicatively coupled to a network 122 and to a server 130. Network 122 can include a carrier network and an internet network. Electronic device 102 can be a portable or relatively stationary electronic device and can communicate via network 122 through wireless or wired communication. Server 130 can be, for example, a web server coupled to the internet of network 122, or can be a localized server coupled to a personal area network 122. Server 130 includes at least two controllers, or command and data processing units. One controller can control the content displayed on the graphical user interface 115 (FIG. 1) of electronic device 102. Content controller 232 can read and store data and commands within a data store unit 234, wherein the commands execute upon data via content controller 232 to display the appropriate items at the appropriate locations upon the user interface of electronic device 102. Examples of content data include pixelated words, images, color, and the various locations for such on the user interface of electronic device 102.

In addition to content controller 232, server 130 can also include a customer intelligence controller 236. Controller 236 operates similar to controller 232 in that commands are issued to read and write data, and to execute upon data as well as operational code within data storage device 238. Both the data and content storage devices 238 and 234 contain the application data command signals sent to electronic device 102, as shown. The application can therefore be downloaded onto electronic device 102 via the internet communicatively coupled to web server 130. The application data can be the specific application from which notifications are sent or selections made as to a new electronic device and the availability of such.

Upgrade eligibility or availability can be sent from customer intelligence controller 236 when a manufacturer 240 sends an announcement via network 122 to server 130. The announcement can be stored in data storage device 238, for example. The announcement can thereafter be sent as an upgrade eligibility/availability notification to electronic device 102. The server 130 can be managed by a network service provider, possibly different from the original equipment manufacturer (OEM) server of the third party manufacturer 240. As a courtesy to the provider's customer, announcements from the OEM 240 as to new versions of the electronic device are stored and sent to the customer's electronic device when that customer or subscriber is eligible for an upgrade to the new electronic device.

Contemporaneous with or delayed from notifying a subscriber of upgrade eligibility can be a priority notification signal sent from server 130 of the network provider to a subscriber's electronic device 102. The priority notification signal can be displayed in the proper content via content controller 232 upon electronic device 102 in various text object forms to indicate the subscriber belonging to the electronic device 102 is not only eligible for an upgrade but also is eligible to receive a priority status value if he or she desires to get in line for prioritized ordering of his/her new electronic device.

If the subscriber wishes prioritized ordering by obtaining a priority status value, or virtual place in line, for pre-orders or orders, he or she is then prompted on the user interface 115 of electronic device 102 to make certain selections. Those selections pertain to various features attributable to the new electronic device. One or more features can be selected by the subscriber, such features include but are not limited to color, memory size, processor speed, screen size, protection plan, and/or payment plan. The features selected upon the user interface of electronic device 102 are then sent as a signal from electronic device 102 through customer intelligence controller 236 and can be stored in data storage device 238 as feature selection data. Along with the selected features, a pre-order date can be stored in data storage device 238. The pre-order date can arise from the announcement signal sent from OEM 240, wherein the manufacturer 240 can send to the network service provider, and specifically server 130 of the network service provider, a date in which customers can pre-order their new electronic devices. Pre-orders based on a priority status value should, however, be made in a timely fashion.

Figure 3:
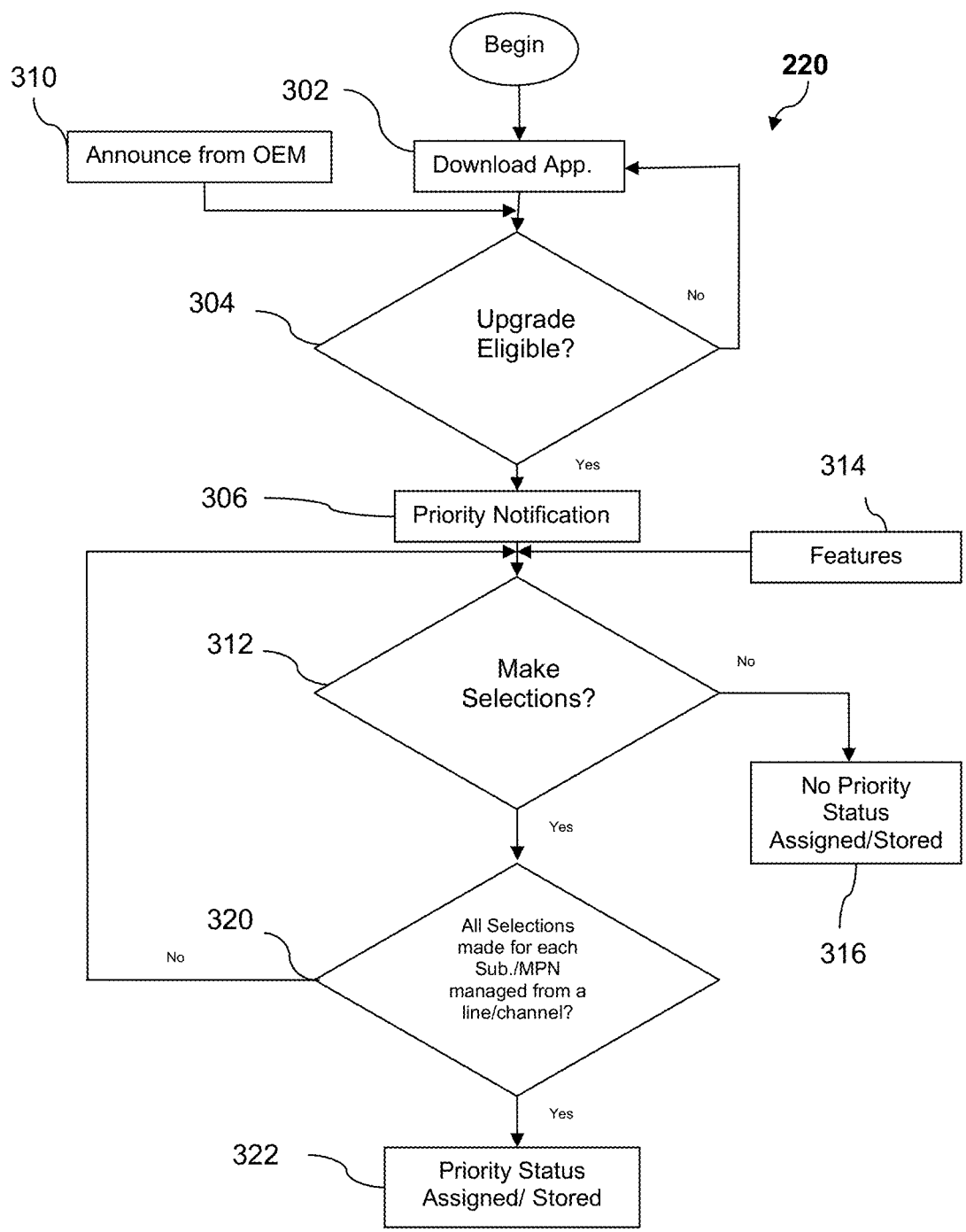
FIG. 3 is a flow diagram of the ordering system and method for assigning a priority status value according to an embodiment of the disclosure.

Turning to FIG. 3, a flow diagram of ordering system and method 300 is shown. The flow diagram of FIG. 3 describes the executable engine software and state machine contained in the combination of electronic device 102 as well as the controllers 232 and 236 of server 130 shown in FIG. 2. The executable operating system of electronic device 102 downloading a software application from, for example, a web server 130, is shown in block 302. The application software, or application after being downloaded 302, can thereafter periodically query server 130 to determine if the subscriber corresponding to electronic device 102 is eligible for an upgrade 304. Upgrade eligibility is determined based upon the customer intelligence controller 236 querying a database of customers within the data storage device 238 to determine if a particular subscriber is eligible for an upgrade of a component or the entire item that would constitute a new electronic device within that subscriber's network service provider plan. If the subscriber is not eligible for an upgrade, then no further action need be taken by the subscriber, and no further notifications are sent. However, if the subscriber is eligible for an upgrade, then a priority notification signal 306 is sent to the electronic device 102, but only if the manufacturer sends an announcement signal 310 from the OEM server notifying that a particular new electronic device will be made available on, for example, a specific date.

Once priority notification 306 is sent to the electronic device 102, then a subscriber can actuate the user interface 115 on electronic device 102 to make certain selections 312 of features 314 available on the new electronic device. If no selections are made, then no priority status value is assigned or stored 316 within, for example, the data storage device 238 (FIG. 2).

From a single electronic device that has proper administrative privileges over other electronic devices on, for example, a family plan, selections for other, new electronic devices for other members of the family can be made over a single line or channel. For example, the father can be a primary subscriber with administrative privileges to the network service provider family plan, and can manage selections for his children also on the plan for their corresponding new electronic devices. If all selections are not made for each subscriber, identification number, mobile phone number, etc. managed from the administrator single line or channel 320, then further selections for other family members can be made from that single line or channel until all selections for each family member subscriber are made. Once all selections are made for all family members wanting a new electronic device with corresponding features, then a priority status value is assigned to each of those selected new electronic devices and that priority status value with corresponding subscriber identification numbers of each subscriber are stored 322.

Figure 4:
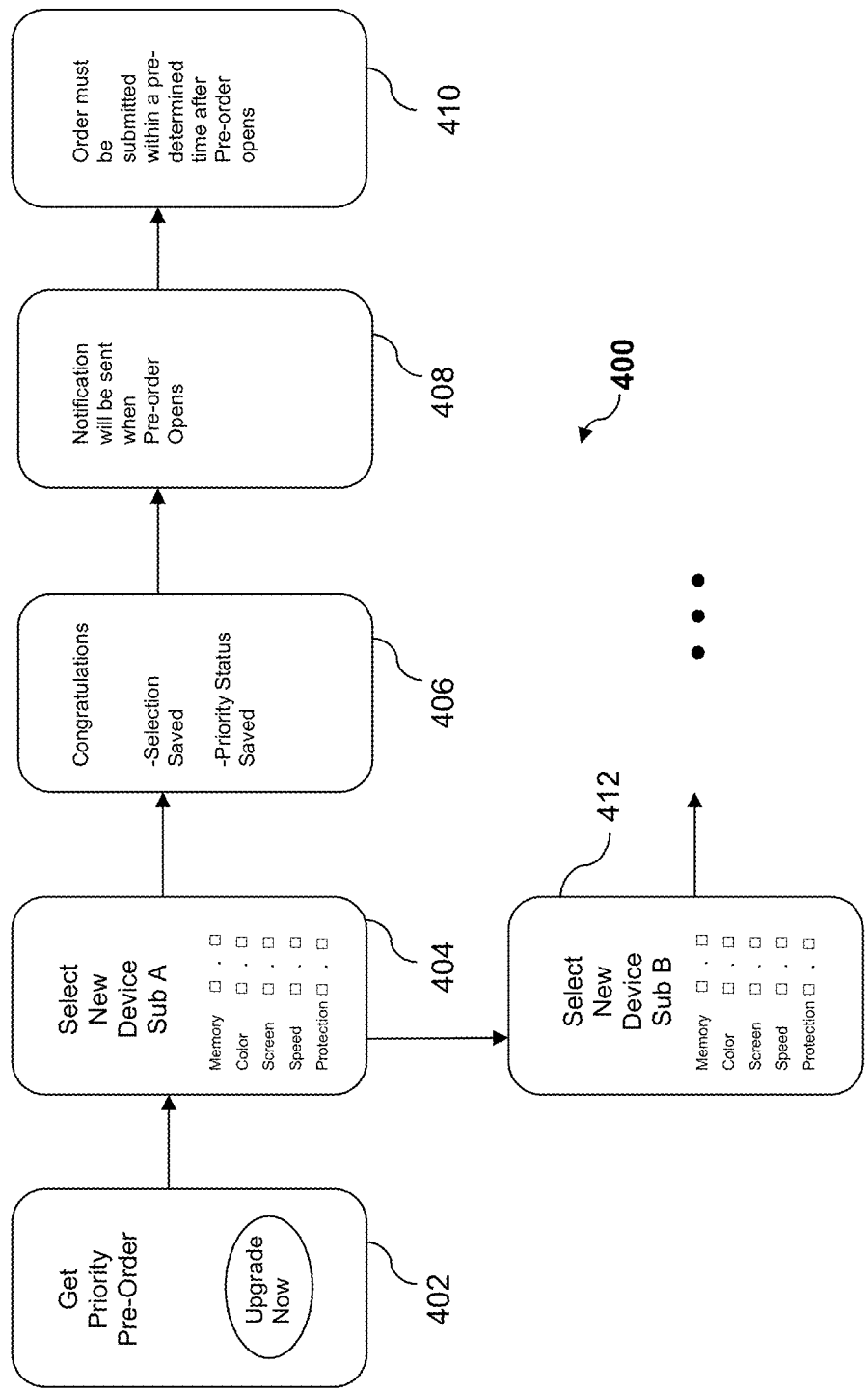
FIG. 4 is a schematic diagram of a sequence of displayed interfaces for assigning a priority status value to one or more features of a new electronic device according to an embodiment of the disclosure.

Turning now to FIG. 4, a sequence of displayed user interface screenshots 400 are shown according to one example. The text shown in the displayed screenshots 400 are only examples of certain notifications that can appear on the screen of electronic device 102. For example, if a subscriber is upgrade eligible, then a priority notification indicator on the user interface can appear on screen 402. The priority notification can simply ask the subscriber if the subscriber wishes to obtain priority for a pre-order by actuating an Upgrade Now button. Next, the screen may display certain selections attributable to the upgradable new electronic device. Examples of those selections are features shown in screen 404. A user can select the features via actuating the appropriate button on the user interface and, when completed, the next screenshot will indicate that all selections have been saved and a priority status given for that particular new electronic device attributed to, for example, subscriber A, as shown in screenshot 406. In the next screenshot, a user will be notified when pre-orders are open 408. Screenshot 408 may also indicate a particular date in which pre-orders are open for that particular selected new electronic device. Another notification may be sent 410 indicating to the subscriber that when the pre-order opens, orders must be submitted within a predetermined time. If orders are not submitted within that timeframe, as indicated in screenshot 410, then the priority status value assigned to that new electronic device may be voided or erased from the data storage device 238 (FIG. 2).

The screenshots attributable to subscriber A may furthermore be repeated for subscriber B and can be displayed in sequence beginning with subscriber A, then next to subscriber B, and further to subscriber C, and so on. The selection for subscriber B can appear in a screenshot on the same electronic device in which selections for subscriber A were made, the latter screenshot being that shown as reference numeral 412. There can be possibly numerous subscribers all managed or administered from a single electronic device of the primary subscriber across a single line or channel so that the selected new electronic device can be assigned a priority status value for each such device among all family members, for example.

Figure 5:
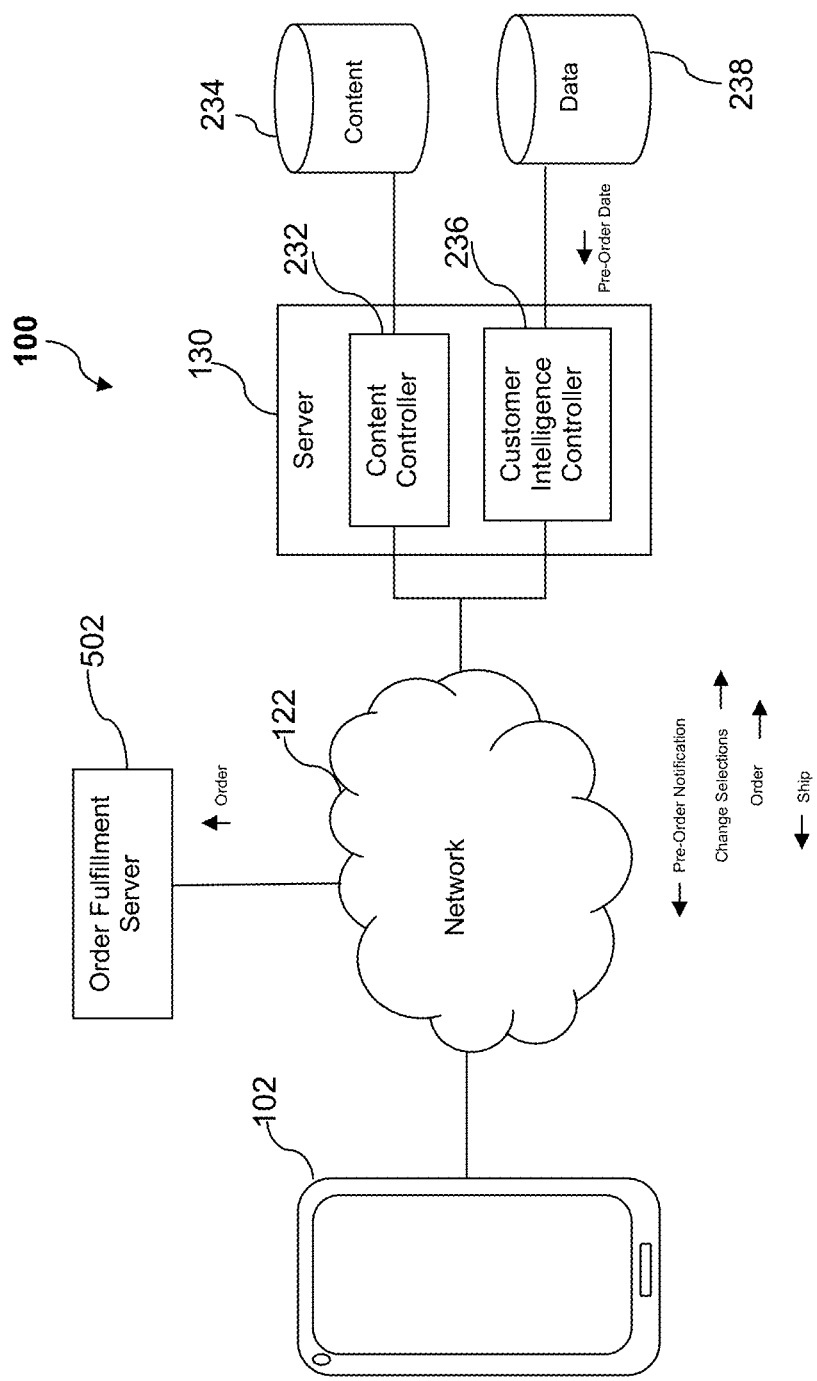
FIG. 5 is a block diagram of an electronic communication system configured as an ordering system to place orders for a new electronic device based on an assigned priority status value according to an embodiment of the disclosure.

Turning now to FIG. 5, ordering system 100 is shown having similar components as that of FIGS. 1 and 2, yet with an additional server 502 to fulfill orders and perform shipment operations. Ordering system 100 is shown in FIG. 5 as having various signals that occur after a priority status value is assigned to corresponding selected, new electronic devices. Specifically, FIG. 5 illustrates what occurs when the pre-orders open, beginning with a pre-order date sent from a database within data storage device 238. The pre-order date is triggered based on the date in which pre-orders are opened, and is sent to controller 236, which then sends a pre-order notification from server 130 to electronic device 102. The pre-order notification signal can simply be a command to the API of electronic device 102 to formulate a text message or email, notifying the subscriber if he or she wishes to now upgrade and place an order.

After the pre-order notification signal is sent, and the appropriate message is displayed, the subscriber is then presented with the pre-order selections assigned to that customer or subscriber when the priority status values were assigned. The user then can activate certain buttons on the user interface 115 of his or her electronic device 102 to change the previous selections and features corresponding to those selections after pre-orders are open. The subscriber is then invited on the user interface through a confirmation notification signal to confirm his or her order, and the order for each new electronic device corresponding to a network service provider plan is sent from, for example, a single electronic device having administrator privileges for each member's new electronic device to server 130. The order can be stored in a database within storage device 238, as well as being sent to an order fulfillment server 502. Order fulfillment server 502 will then instruct a shipment date or pickup date message to be sent to the electronic device 102, notifying the subscriber or subscribers when their new electronic devices will be shipped or made available for pickup. The various notifications, such as the pre-order notification and the shipment notifications, can be sent as a message on the user interface of the electronic device 102, or as a text message or e-mail to each corresponding subscriber having a registered mobile phone number and/or e-mail stored in the network service provider server corresponding to a subscriber's profile.

Figure 6:
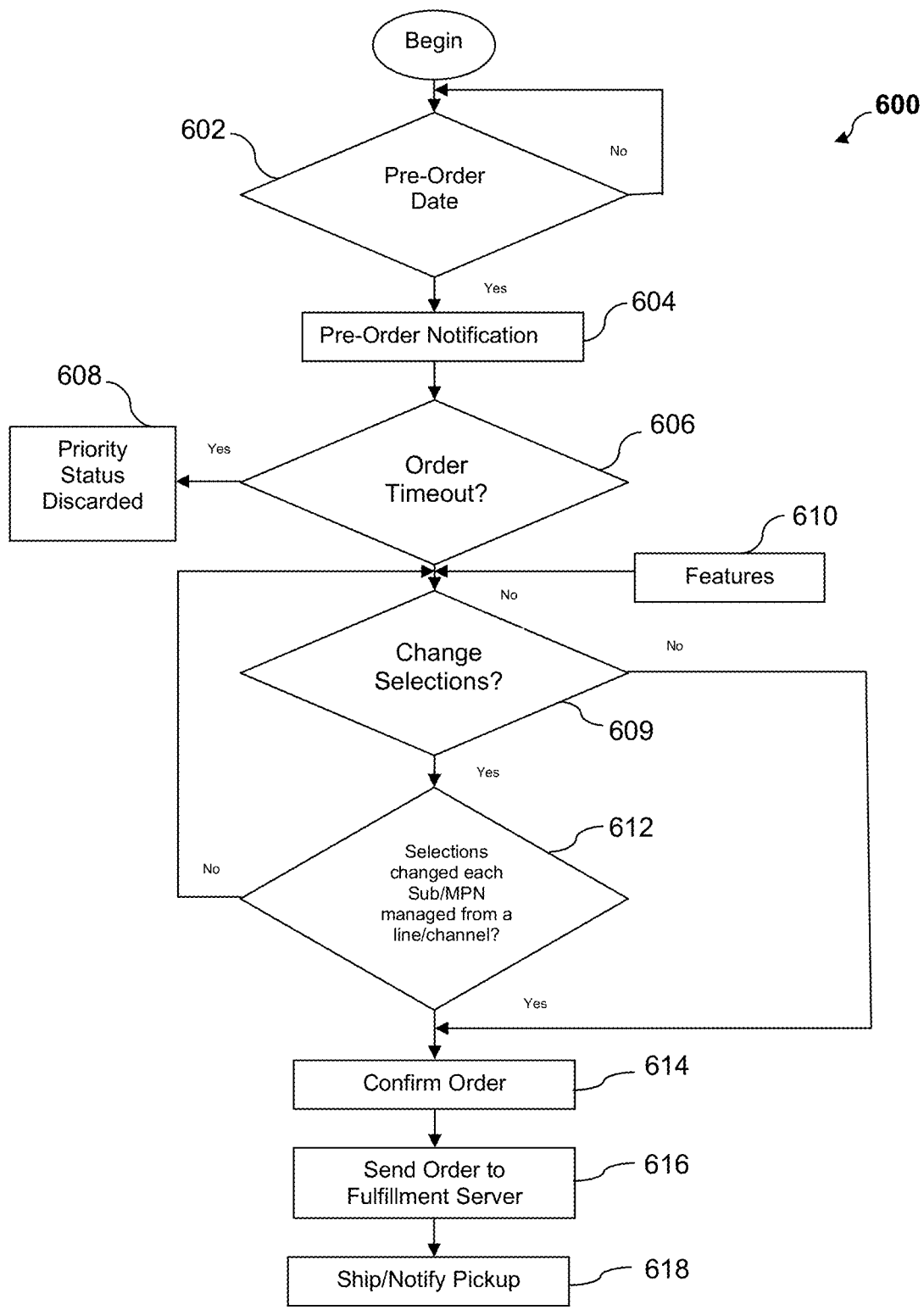
FIG. 6 is a flow diagram of the ordering system and method for placing orders for a new electronic device when pre-orders are open according to an embodiment of the disclosure.

Turning now to FIG. 6, a flow diagram 600 is shown of the interoperability of the prioritized ordering system and methodology. A pre-order date is determined and if the pre-order date has arrived 602, then a pre-order notification 604 is sent to the electronic device 102 (FIGS. 1 and 2). The pre-order notification signal is sent, and possibly a timer is set contemporaneous with sending that signal. The timer operates in real time and if the timer expires after a pre-set amount of time 606 before an order is made for the previously selected new electronic device, then the priority status value corresponding to that new electronic device may be discarded 608. A subscriber may therefore have a limited amount of time in which to place his or her order once pre-order notification is sent. If the subscriber does not place a timely order, then the priority status value corresponding to the previously selected new electronic device can be discarded and the subscriber may no longer be availed of the benefits of the previously established priority status value. If priority status value is lost, the subscriber may be left with placing and fulfilling an order similar to other subscribers who do not have a priority status value, including possibly physically or virtually standing in line to place that order and receive shipment notification.

However, if the order is placed within the time-out period, and thus the order timeout 606 does not expire prior to placing the order, any selections can be changed 609 by changing features 610 corresponding to the to-be-ordered new electronic devices 610. If all selections are changed within the time-out period 612, then an order confirmation notification 614 is sent. As previously noted, selections can be made and changed for each subscriber and for each mobile phone number (MPN) managed or administered from a single line or channel, and thus from a single electronic device or administrator subscriber. Selections for possible multiple new electronic devices from a single administrator line or channel must preferably be made within the order time-out period, otherwise the priority status for those whose changes were not made may be discarded. The order time-out period is preferably a pre-set or pre-determined amount of time such as, for example, twenty-four hours.

Once the order or orders are confirmed either on a single electronic device or multiple electronic devices corresponding to each order, the stored orders can be sent to an order fulfillment server 616. The order fulfillment server can be, for example, a web server, and the web server can be attributed to the manufacturer or the network service provider. The order fulfillment server can therefore be any server having an execution engine which receives an order and a command to send a confirmation signal to a subscriber as to when the new electronic device or devices will be shipped or available for pickup at a particular location 618.

Figure 7:
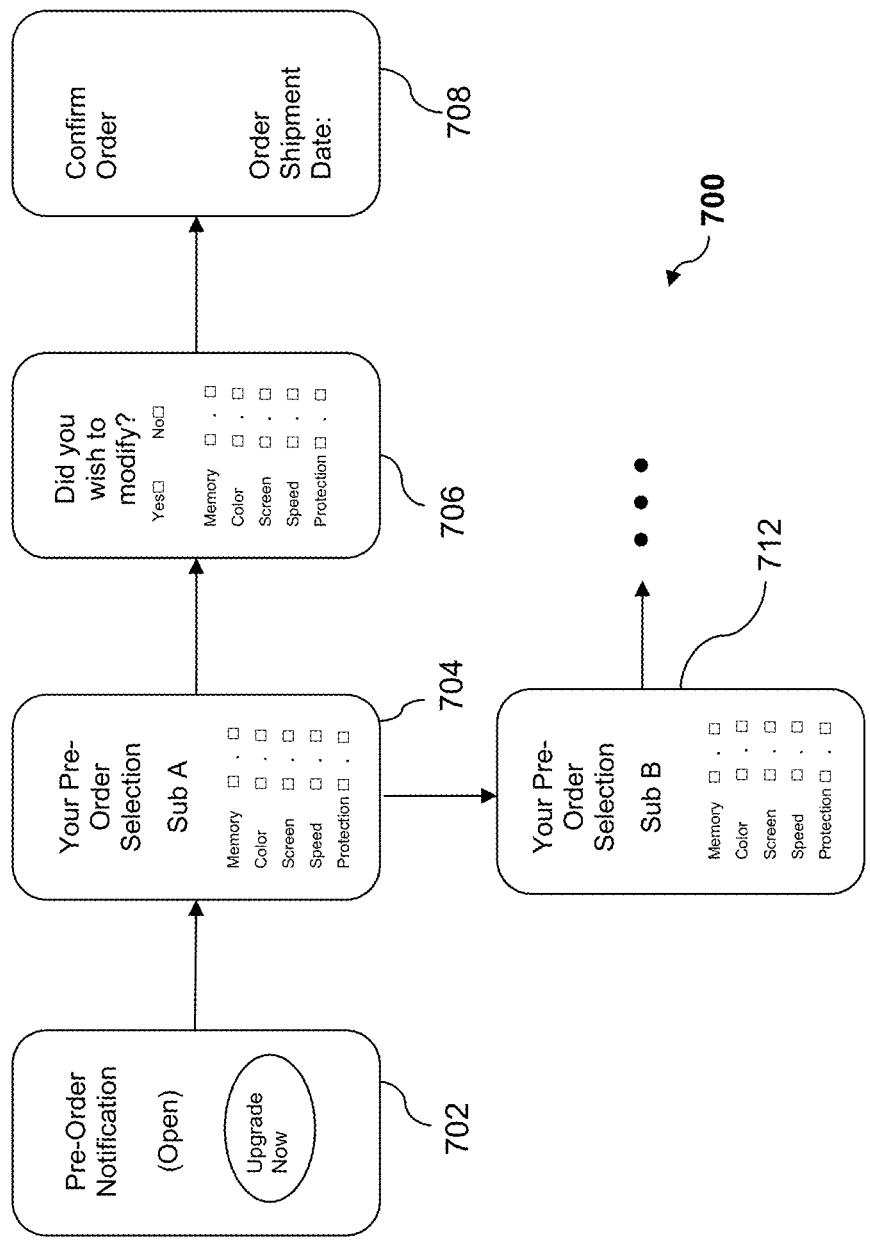
FIG. 7 is a schematic diagram of a sequence of displayed interfaces for placing orders for a new electronic device when pre-orders are open according to an embodiment of the disclosure.

Turning now to FIG. 7, a screenshot sequence of displayed interfaces 700 are shown. The sequence of displayed interfaces 700 are those which appear on the user interface 115 of a display corresponding to electronic device 102. Specifically, the screenshots 700 appear when the pre-orders are open and a pre-order notification is sent, beginning with screenshot 702. A user is invited to actuate the Upgrade Now button upon receiving the pre-order notification. The order timer begins when the pre-order notification signal is sent and, for example, each subscriber, beginning with subscriber A, etc., receives the selected features for his or her corresponding new electronic device as shown in screenshot 704. A subscriber, such as subscriber A, is allowed to modify their prior selections by pressing the appropriate button on screenshot 706. Once the changes or modifications are made, preferably within the order time-out period, an order confirmation signal will be sent and also possibly an order shipment or pickup date, as shown in screenshot 708.

The plan administrator subscriber of, for example, a family plan can make modifications to other subscribers belonging to that plan, who are upgrade eligible and have a previously established priority status value. Provided each subscriber, beginning with subscriber A, then subscriber B individually or via administrator subscriber A, completes the appropriate modifications within the timeout period, those changes will be stored and the previously stored priority status value for the changed new electronic device will be maintained so that the subscriber(s) maintains his or her place in line that was previously established when the subscriber(s) obtained their place in line with a priority status value assigned thereto.

If the changes or modifications to the previous selections are not completed within the pre-determined amount of time (possibly due to a subscriber not wishing to make changes), then the priority status value may still be maintained when fulfilling orders for the corresponding new electronic devices provided the subscriber simply confirms an Upgrade Now actuation when the pre-order notification is sent, or within the pre-determined time-out period.

It is understood that electronic device 102 is operable for implementing aspects of the present disclosure, but the present disclosure should not be limited to these implementations. Though illustrated as a mobile, portable or stationary device 102, the user interface 115 (FIG. 1) of electronic device 102 can include a touchscreen display having a touch-sensitive surface or mouse actuated surface for input by a user. A small number of application icons can be present within the display. It is understood that in different embodiments, any number of application icons may be presented in the display. In some embodiments, a user may be able to download and install additional applications, and an icon associated with such downloaded and installed applications may be added to the display or to an alternative screen. The electronic device 102 may have other components such as electro-mechanical switches, speakers, camera lenses, microphones, input and/or output connectors, and other components as are well known in the art. The electronic device 102 may present options for the user to select, controls for the user to actuate, and/or cursors or other indicators for the user to direct. The electronic device 102 may further accept data entry from the user, including numbers to dial or various parameter values for configuring the operation of the handset. The electronic device 102 may further execute one or more software or firmware applications in response to user commands. These applications may configure the electronic device 102 to perform various customized functions in response to user interaction. Additionally, the electronic device 102 may be programmed and/or configured over-the-air, for example from a wireless base station, a wireless access point, or a peer electronic device 102. The electronic device 102 may execute a web browser application which enables the touch screen display 930 to show a web page. The web page may be obtained via wireless communications with a base transceiver station, a wireless network access node, a peer electronic device 102 or any other wireless communication network or system.

Figure 8:
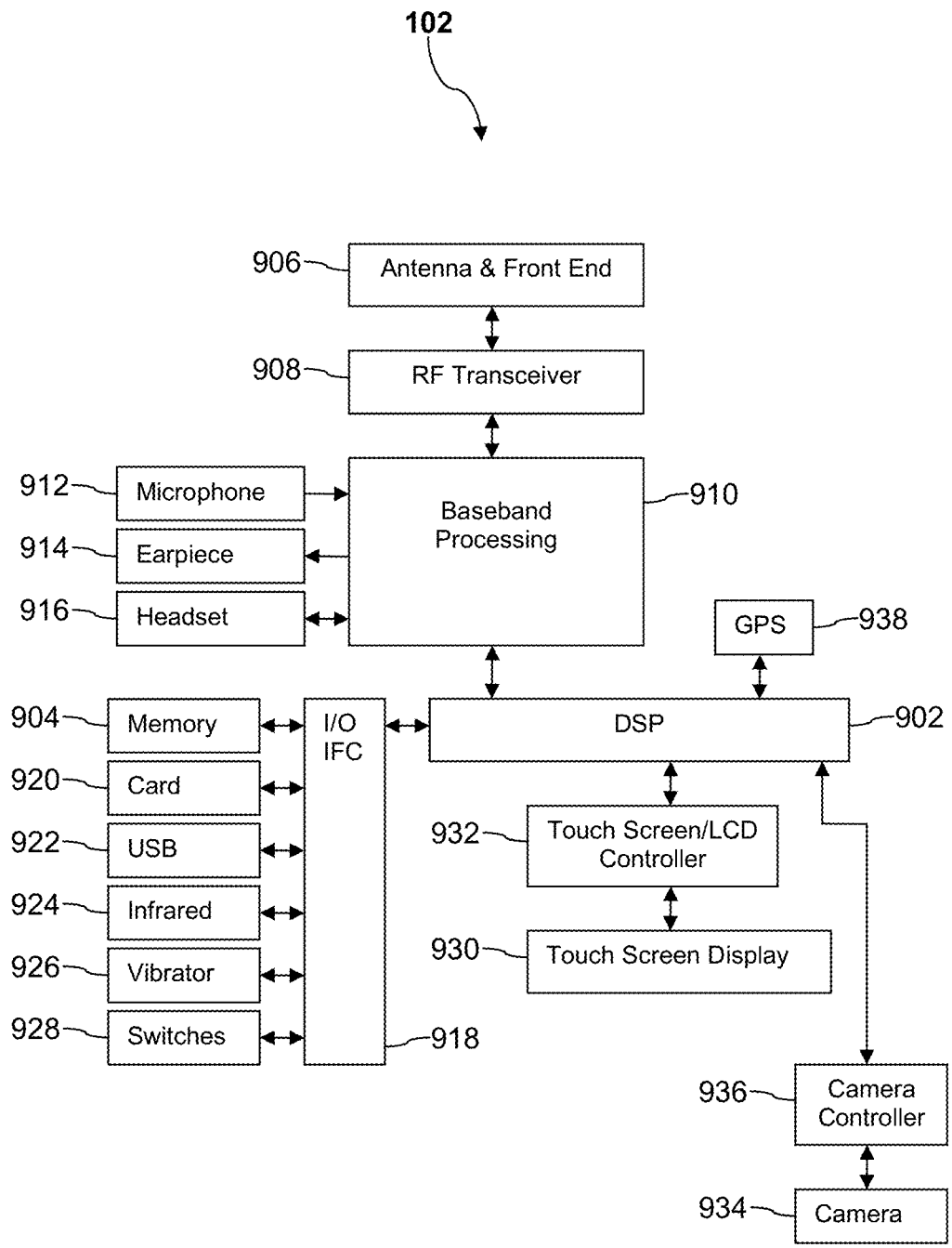
FIG. 8 is a block diagram of hardware architecture of an electronic device with wired or wireless communication according to an embodiment of the disclosure.

FIG. 8 shows a block diagram of the electronic device 102 according to one example. While a variety of known components of handsets are depicted, in an embodiment a subset of the listed components and/or additional components not listed may be included in the electronic device 102. The electronic device 102 includes a digital signal processor (DSP) 902 and a memory 904. As shown, the electronic device 102 may further include an antenna and front end unit 906, a radio frequency (RF) transceiver 908, a baseband processing unit 910, a microphone 912, an earpiece speaker 914, a headset port 916, an input/output interface 918, a removable memory card 920, a universal serial bus (USB) port 922, an infrared port 924, a vibrator 926, one or more electro-mechanical switches 928, a touch screen liquid crystal display (LCD) with a touch screen display 930, a touch screen/LCD controller 932, a camera 934, a camera controller 936, and a global positioning system (GPS) receiver 938. In an embodiment, the electronic device 102 may include another kind of display that does not provide a touch sensitive screen. In an embodiment, the electronic device 102 may include both the touch screen display 930 and additional display component that does not provide a touch sensitive screen. In an embodiment, the DSP 902 may communicate directly with the memory 904 without passing through the input/output interface 918. Additionally, in an embodiment, the electronic device 102 may comprise other peripheral devices that provide other functionality.

The DSP 902 or some other form of controller or central processing unit operates to control the various components of the electronic device 102 in accordance with embedded software or firmware stored in memory 904 or stored in memory contained within the DSP 902 itself. In addition to the embedded software or firmware, the DSP 902 may execute other applications stored in the memory 904 or made available via information carrier media such as portable data storage media like the removable memory card 920 or via wired or wireless network communications. The application software may comprise a compiled set of machine-readable instructions that configure the DSP 902 to provide the desired functionality, or the application software may be high-level software instructions to be processed by an interpreter or compiler to indirectly configure the DSP 902.

The DSP 902 may communicate with a wireless network via the analog baseband processing unit 910. In some embodiments, the communication may provide Internet connectivity, enabling a user to gain access to content on the Internet and to send and receive e-mail or text messages. The input/output interface 918 interconnects the DSP 902 and various memories and interfaces. The memory 904 and the removable memory card 920 may provide software and data to configure the operation of the DSP 902. Among the interfaces may be the USB port 922 and the infrared port 924. The USB port 922 may enable the electronic device 102 to function as a peripheral device to exchange information with a personal computer or other computer system. The infrared port 924 and other optional ports such as a Bluetooth® interface or an IEEE 802.11 compliant wireless interface may enable the electronic device 102 to communicate wirelessly with other nearby handsets and/or wireless base stations. In an embodiment, the electronic device 102 may comprise a near field communication (NFC) transceiver. The NFC transceiver may be used to complete payment transactions with point-of-sale terminals or other communications exchanges. In an embodiment, the electronic device 102 may comprise a radio frequency identify (RFID) reader and/or writer device.

The switches 928 may couple to the DSP 902 via the input/output interface 918 to provide one mechanism for the user to provide input to the electronic device 102. Alternatively, one or more of the switches 928 may be coupled to a motherboard of the electronic device 102 and/or to components of the electronic device 102 via a different path (e.g., not via the input/output interface 918), for example coupled to a power control circuit (power button) of the electronic device 102. The touch screen display 930 is another input mechanism, which further displays text and/or graphics to the user. The touch screen LCD controller 932 couples the DSP 902 to the touch screen display 930. The GPS receiver 938 is coupled to the DSP 902 to decode global positioning system signals, thereby enabling the electronic device 102 to determine its position.

Figure 9A:
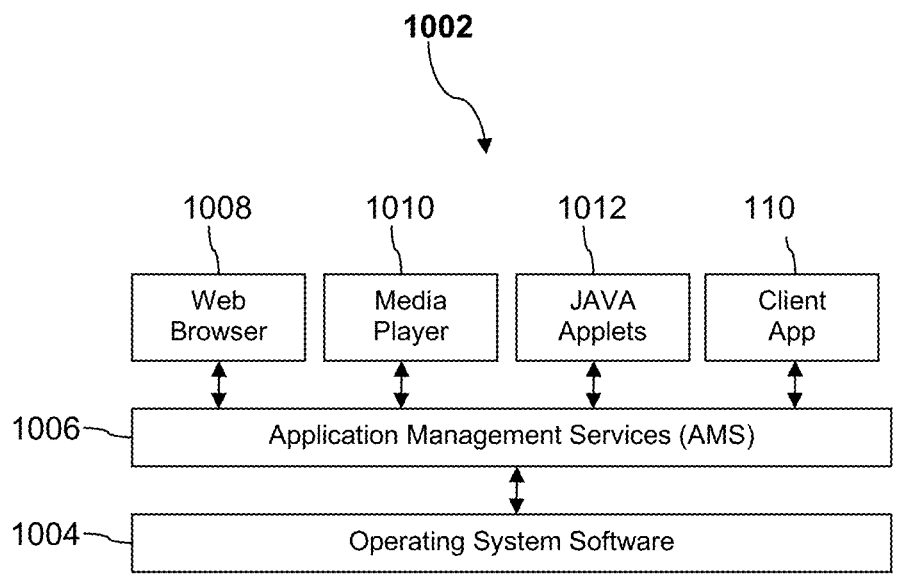
FIG. 9A is a block diagram of a software architecture of an electronic device according to an embodiment of the disclosure.

FIG. 9A illustrates a software environment 1002 that may be implemented by the DSP 902. The DSP 902 executes operating system software 1004 that provides a platform from which the rest of the software operates. The operating system software 1004 may provide a variety of drivers for the handset hardware with standardized interfaces that are accessible to application software. The operating system software 1004 may be coupled to and interact with application management services (AMS) 1006 that transfer control between applications running on the electronic device 102. Also shown in FIG. 9A are a web browser application 1008, a media player application 1010, JAVA applets 1012, and the client application 110 described above with reference to FIG. 1. The web browser application 1008 may be executed by the electronic device 102 to browse content and/or the Internet, for example when the electronic device 102 is coupled to a network via a wireless link. The web browser application 1008 may permit a user to enter information into forms and select links to retrieve and view web pages. The media player application 1010 may be executed by the electronic device 102 to play audio or audiovisual media. The JAVA applets 1012 may be executed by the electronic device 102 to provide a variety of functionality including games, utilities, and other functionality.

Figure 9B:
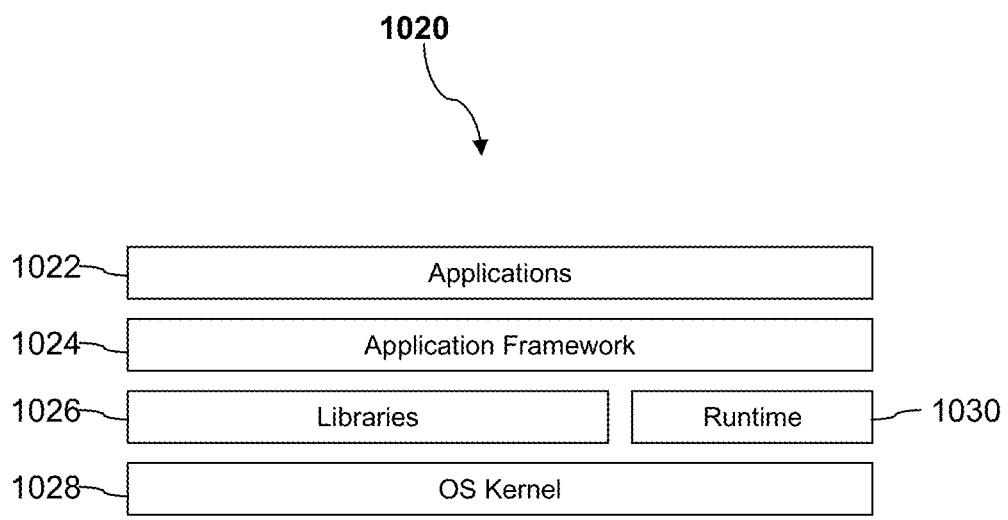
FIG. 9B is a block diagram of another software architecture of an electronic device according to an embodiment of the disclosure.

FIG. 9B illustrates an alternative software environment 1020 that may be implemented by the DSP 902 or electronic device 102. The DSP 902 executes operating system kernel (OS kernel) 1028 and an execution runtime 1030. The DSP 902 executes applications 1022 that may execute in the execution runtime 1030 and may rely upon services provided by the application framework 1024. Applications 1022 and the application framework 1024 may rely upon functionality provided via the libraries 1026.

Figure 10:
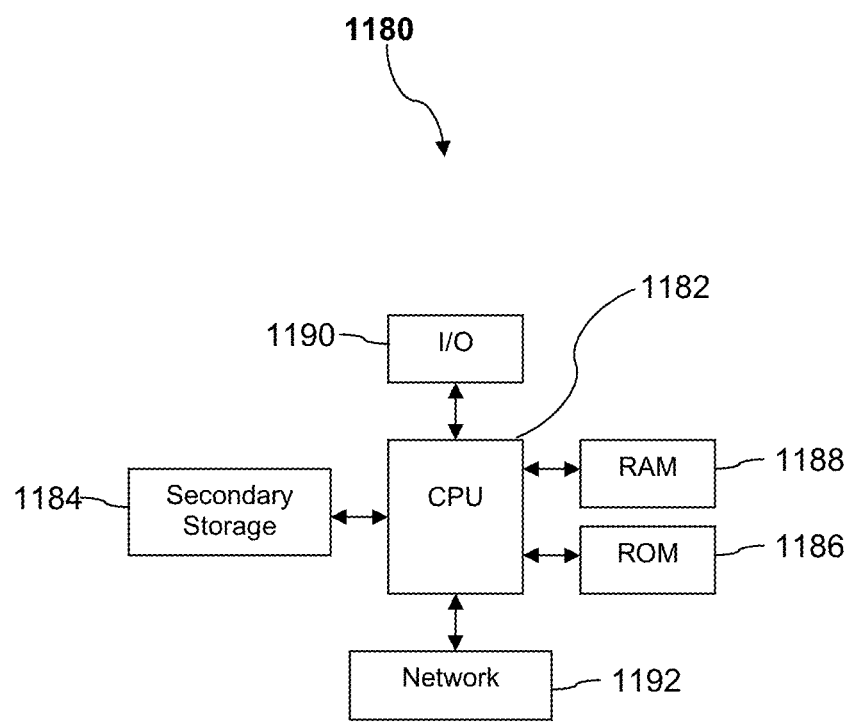
FIG. 10 is a block diagram of the electronic device as a computer system according to an embodiment of the disclosure.

FIG. 10 illustrates a computer system 1180 suitable for implementing one or more embodiments disclosed herein. The computer system 1180 includes a processor 1182 (which may be referred to as a central processor unit or CPU) that is in communication with memory devices including secondary storage 1184, read only memory (ROM) 1186, random access memory (RAM) 1188, input/output (I/O) devices 1190, and network connectivity devices 1192. The processor 1182 may be implemented as one or more CPU chips.

It is understood that by programming and/or loading executable instructions onto the computer system 1180, at least one of the CPU 1182, the RAM 1188, and the ROM 1186 are changed, transforming the computer system 1180 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 1180 is turned on or booted, the CPU 1182 may execute a computer program or application. For example, the CPU 1182 may execute software or firmware stored in the ROM 1186 or stored in the RAM 1188. In some cases, on boot and/or when the application is initiated, the CPU 1182 may copy the application or portions of the application from the secondary storage 1184 to the RAM 1188 or to memory space within the CPU 1182 itself, and the CPU 1182 may then execute instructions that the application is comprised of. In some cases, the CPU 1182 may copy the application or portions of the application from memory accessed via the network connectivity devices 1192 or via the I/O devices 1190 to the RAM 1188 or to memory space within the CPU 1182, and the CPU 1182 may then execute instructions that the application is comprised of. During execution, an application may load instructions into the CPU 1182, for example load some of the instructions of the application into a cache of the CPU 1182. In some contexts, an application that is executed may be said to configure the CPU 1182 to do something, e.g., to configure the CPU 1182 to perform the function or functions promoted by the subject application. When the CPU 1182 is configured in this way by the application, the CPU 1182 becomes a specific purpose computer or a specific purpose machine.

The secondary storage 1184 is typically comprised of one or more disk drives or tape drives and is used for non-volatile storage of data and as an over-flow data storage device if RAM 1188 is not large enough to hold all working data. Secondary storage 1184 may be used to store programs which are loaded into RAM 1188 when such programs are selected for execution. The ROM 1186 is used to store instructions and perhaps data which are read during program execution. ROM 1186 is a non-volatile memory device which typically has a small memory capacity relative to the larger memory capacity of secondary storage 1184. The RAM 1188 is used to store volatile data and perhaps to store instructions. Access to both ROM 1186 and RAM 1188 is typically faster than to secondary storage 1184. The secondary storage 1184, the RAM 1188, and/or the ROM 1186 may be referred to in some contexts as computer readable storage media and/or non-transitory computer readable media.

I/O devices 1190 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 1192 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 1192 may enable the processor 1182 to communicate with the Internet or one or more intranets. With such a network connection, it is contemplated that the processor 1182 might receive information from the network, or might output information to the network in the course of performing the above-described method steps. Such information, which is often represented as a sequence of instructions to be executed using processor 1182, may be received from and outputted to the network, for example, in the form of a computer data signal embodied in a carrier wave.

Such information, which may include data or instructions to be executed using processor 1182 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 1182 executes instructions, codes, computer programs, scripts which it accesses from hard disk, floppy disk, optical disk (these various disk based systems may all be considered secondary storage 1184), flash drive, ROM 1186, RAM 1188, or the network connectivity devices 1192. While only one processor 1182 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 1184, for example, hard drives, floppy disks, optical disks, and/or other device, the ROM 1186, and/or the RAM 1188 may be referred to in some contexts as non-transitory instructions and/or non-transitory information.

In an embodiment, the computer system 1180 that formulates in part the hardware and software operability of the communication system 100 and/or electronic device 102 hereof, may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 1180 to provide the functionality of a number of servers that is not directly bound to the number of computers in the computer system 1180. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 1180, at least portions of the contents of the computer program product to the secondary storage 1184, to the ROM 1186, to the RAM 1188, and/or to other non-volatile memory and volatile memory of the computer system 1180. The processor 1182 may process the executable instructions and/or data structures in part by directly accessing the computer program product, for example by reading from a CD-ROM disk inserted into a disk drive peripheral of the computer system 1180. Alternatively, the processor 1182 may process the executable instructions and/or data structures by remotely accessing the computer program product, for example by downloading the executable instructions and/or data structures from a remote server through the network connectivity devices 1192. The computer program product may comprise instructions that promote the loading and/or copying of data, data structures, files, and/or executable instructions to the secondary storage 1184, to the ROM 1186, to the RAM 1188, and/or to other non-volatile memory and volatile memory of the computer system 1180.

In some contexts, the secondary storage 1184, the ROM 1186, and the RAM 1188 may be referred to as a non-transitory computer readable medium or a computer readable storage media. A dynamic RAM embodiment of the RAM 1188, likewise, may be referred to as a non-transitory computer readable medium in that while the dynamic RAM receives electrical power and is operated in accordance with its design, for example during a period of time during which the computer system 1180 is turned on and operational, the dynamic RAM stores information that is written to it. Similarly, the processor 1182 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for ordering of a new electronic device, comprising:
   receiving, by an electronic device, a notification of an upgrade to a new electronic device;
   selecting, via the electronic device, a feature for the new electronic device;
   storing, by a server, the feature for the new electronic device along with a pre-order opening date in a database;
   assigning, by the server, a priority status value to the stored feature corresponding to the new electronic device, wherein the priority status value corresponds to a relative place in line at which a pre-order for the new electronic device is taken during the pre-order opening date relative to other pre-orders for the new electronic device, and wherein the priority status value is stored in the database;
   in response to reaching the pre-order opening date, receiving, by the electronic device, a pre-order notification;
   initiating, by the server, an order timer associated with the pre-order notification after the pre-order opening date occurs, wherein the order timer sets a time-out period within which an order for the new electronic device must be placed;
   ordering the new electronic device, via the electronic device, within the time-out period after the pre-order opening date; and
   deleting, by the server, the priority status value and the selected feature for the new electronic device from the database after the time-out period such that the relative place in line remains only during the time-out period.

2. The method of claim 1, further comprising receiving on a user interface of the electronic device an announcement of the availability of the new electronic device from a manufacturer of the new electronic device.

3. The method of claim 1, further comprising transmitting from the server communicatively linked to the database located at a network service provider a command to an order fulfillment server in response to the ordering.

4. The method of claim 3, wherein the command comprises notifying a shipment or pickup date for the new electronic device, and wherein the electronic device displays the shipment or pickup date for the new electronic device on a user interface of the electronic device.

5. A system for ordering a new electronic device, comprising:
   a server communicatively coupled to an electronic device configured to:
      send a notification to the electronic device, the notification notifying the electronic device of an upgrade to a new electronic device,
      receive a selection of a feature for the new electronic device from the electronic device,
      store the feature for the new electronic device along with a pre-order opening date in a database,
      assign a priority status value to the stored feature corresponding to the new electronic device, wherein the priority status value corresponds to a relative place in line at which a pre-order for the new electronic device is taken during the pre-order opening date relative to other pre-orders for the new electronic device, and wherein the priority status value is stored in the database,
      in response to reaching the pre-order opening date, transmit a pre-order notification to the electronic device,
      initiates an order timer associated with the pre-order notification after the pre-order opening date occurs, wherein the order timer sets a time-out period within which an order for the new electronic device must be placed,
      receives an order for the new electronic device from the electronic device within the time-out period, and
      deletes the priority status value and the selected feature for the new electronic device from the database after the time-out period such that the relative place in line remains only during the time-out period.

6. The system of claim 5, further comprising the electronic device, wherein the electronic device is configured with an application programming interface to:
   receive the notification of the upgrade to the new electronic device, and
   send the selection of the feature for the new electronic device.

7. The system of claim 6, wherein the electronic device comprises a wireless communication device, and wherein the server is communicatively coupled to the electronic device via a cellular carrier or internet network.

8. The system of claim 6, wherein the application programming interface comprises a user interface upon which a user can select the feature for the new electronic device.

9. The system of claim 8, wherein the feature is selected from the group consisting of color, memory size, screen size, speed of operation, payment plan and protection plan.

10. The system of claim 5, wherein the priority status value corresponds to a priority at which a pre-order for the new electronic device is taken when the pre-order opening date occurs.

11. The system of claim 5, wherein the priority status value is a numerical value corresponding to the relative place in line at which the pre-order for the new electronic device is taken relative to other pre-orders for other new electronic devices.

12. The system of claim 5, wherein the relative place in line remains only during when the pre-order for the new electronic device is open.

13. The system of claim 5, wherein the server is configured to receive an announcement of the new electronic device from a manufacturer of the new electronic device.

14. The system of claim 5, further comprising the database, wherein the database is coupled to the server and configured to:
 store the selected feature for the new electronic device sent to the server from the electronic device, and
 store the priority status value.

15. The system of claim 14, wherein the database is further configured to:
 store the selected feature for a second new electronic device sent to the server from the electronic device, and
 store a second priority status value assigned to the second new electronic device.

* * * * *